US012743226B2

(12) United States Patent
Roberts

(10) Patent No.: US 12,743,226 B2
(45) **Date of Patent: *Sep. 22, 2026**

(54) MEMORY PHASE MONITORING AND SCHEDULING SYSTEM

(71) Applicant: MICRON TECHNOLOGY, INC., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,470

(22) Filed: Dec. 16, 2024

(65) Prior Publication Data

US 2025/0117154 A1 Apr. 10, 2025

Related U.S. Application Data

(63) Continuation of application No. 17/897,886, filed on Aug. 29, 2022, now Pat. No. 12,204,789.

(51) Int. Cl.
*G06F 3/06* (2006.01)

(52) U.S. Cl.
CPC ............ *G06F 3/0653* (2013.01); *G06F 3/061* (2013.01); *G06F 3/0679* (2013.01)

(58) Field of Classification Search
CPC ............................... G06F 3/0653; G06F 3/061
See application file for complete search history.

(56) References Cited

U.S. PATENT DOCUMENTS

| | | | | |
|---|---|---|---|---|
| 11,314,635 | B1 | 4/2022 | Volpe et al. | |
| 2016/0371187 | A1* | 12/2016 | Roberts | G06F 12/0835 |
| 2017/0277444 | A1* | 9/2017 | Canepa | G06F 3/065 |
| 2018/0059933 | A1* | 3/2018 | Helmick | G06F 3/0683 |
| 2018/0074743 | A1 | 3/2018 | Jeter et al. | |
| 2018/0188970 | A1* | 7/2018 | Liu | G06F 3/0653 |
| 2020/0104256 | A1 | 4/2020 | Xu et al. | |
| 2020/0201781 | A1 | 6/2020 | Jain et al. | |
| 2020/0334075 | A1* | 10/2020 | Jägemar | G06F 9/45558 |
| 2021/0019067 | A1 | 1/2021 | Miller et al. | |
| 2021/0117334 | A1 | 4/2021 | Guim Bernat et al. | |
| 2021/0382653 | A1 | 12/2021 | Muthiah | |
| 2022/0083245 | A1 | 3/2022 | Kant et al. | |
| 2022/0129321 | A1 | 4/2022 | Croxford et al. | |
| 2022/0329541 | A1 | 10/2022 | Zhu | |
| 2023/0053568 | A1 | 2/2023 | Hwang | |
| 2023/0305906 | A1* | 9/2023 | Zaykov | G06F 9/5094 |

* cited by examiner

*Primary Examiner* — Tasnima Matin
(74) *Attorney, Agent, or Firm* — Lowenstein Sandler LLP

(57) ABSTRACT

A host system includes a memory and a processing device coupled to the memory to perform operations including obtaining log data from a memory sub-system of a plurality of memory sub-systems, wherein the log data reflects memory usage of a memory device of the memory sub-system, wherein the memory device is shared by the plurality of host systems, including the host system, connected to the plurality of memory sub-systems; and determining, based on the log data, a schedule of a plurality of processes running on the plurality of host systems, wherein the plurality of processes share the memory device.

20 Claims, 10 Drawing Sheets

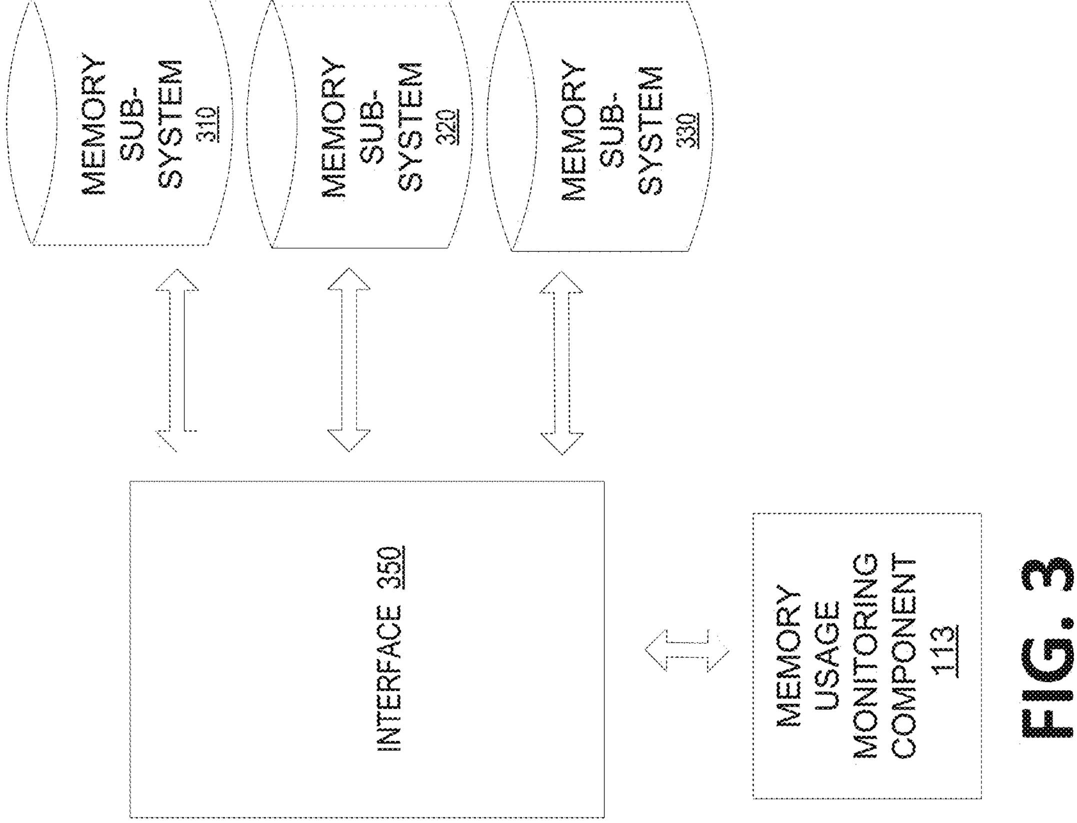
MEMORY SUB-SYSTEM 310
MEMORY SUB-SYSTEM 320
MEMORY SUB-SYSTEM 330
INTERFACE 350
MEMORY USAGE MONITORING COMPONENT 113
FIG. 3
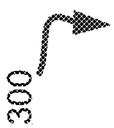
300

MEMORY PHASE MONITORING AND SCHEDULING SYSTEM

RELATED APPLICATIONS

This application is a continuation application of co-pending U.S. patent application Ser. No. 17/897,886, filed Aug. 29, 2022, which is incorporated herein by reference.

TECHNICAL FIELD

Embodiments of the disclosure relate generally to memory sub-systems, and more specifically, relate to memory phase monitoring and scheduling system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block diagram of another example system for memory monitoring and scheduling in accordance with some embodiments of the present disclosure.

DETAILED DESCRIPTION

Figure 1:
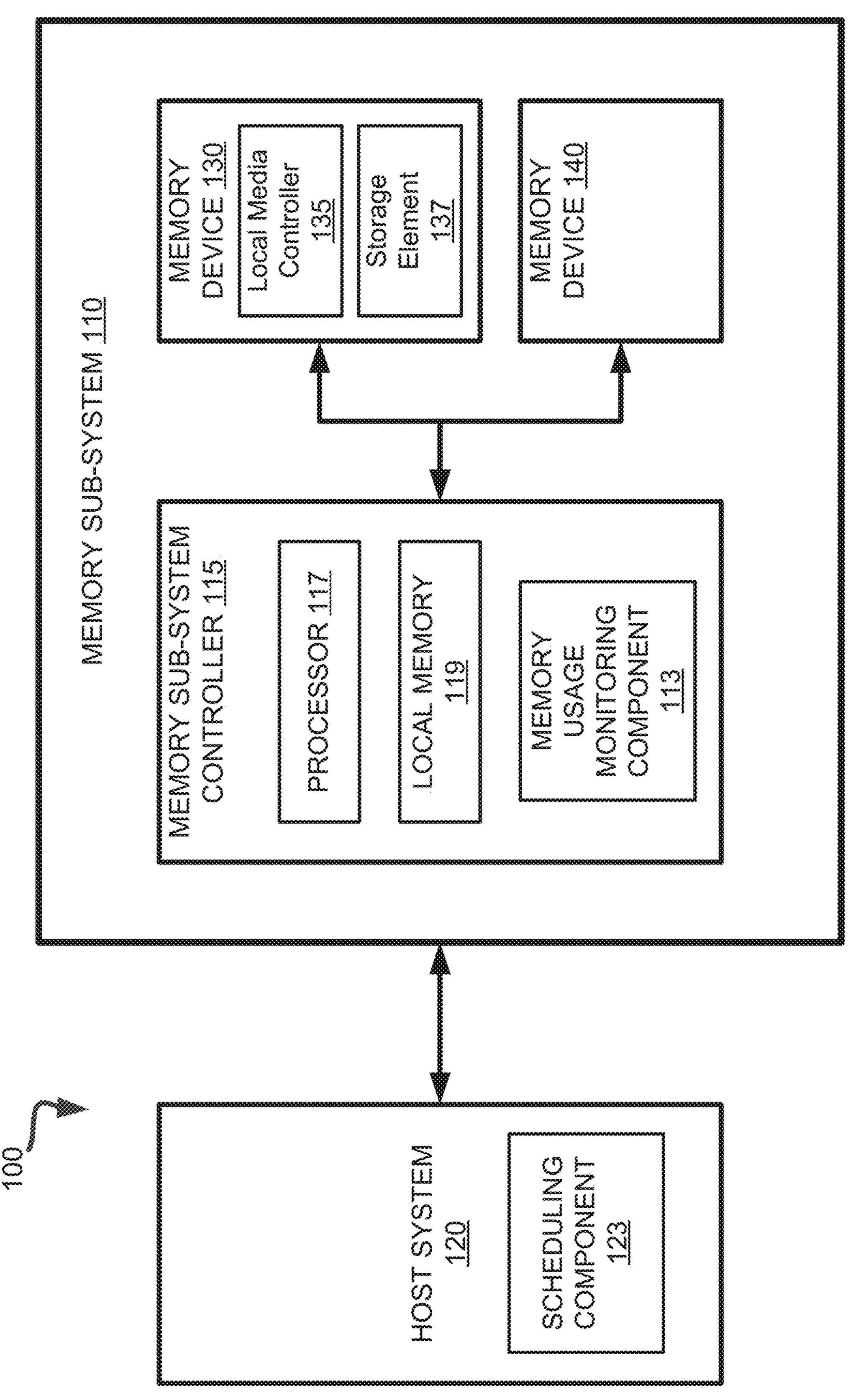
FIG. 1 illustrates an example computing system that includes a memory sub-system in accordance with some embodiments of the present disclosure.

Aspects of the present disclosure are directed to memory phase monitoring and scheduling system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc.

A memory sub-system can include multiple memory devices that can store host data. The memory devices can include multiple different types of media, which may exhibit different characteristics. One example of a characteristic associated with a memory device is data density. Data density reflects the amount of data that can be stored per memory cell of a memory device.

For example, a non-volatile memory device, such as a negative-and (NAND) memory device, is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a quad-level cell (QLC) can store four bits of data while a single-level cell (SLC) can store one bit of data.

Another example of a characteristic of a memory device is access speed, including a speed rendered by the connection between a host system and a memory device of the memory sub-system for data transmission and/or management. In some systems, the connection includes Serializer/Deserializer (SerDes) connection (e.g., Serial Advanced Technology Attachment (SATA), Universal Serial Bus (USB), Peripheral Component Interconnect Express (PCIe), Universal Flash Storage (UFS), etc.). Some connections can include a sequencer component that uses a protocol and timing requirements (e.g., read/write latency, etc.) specific to the memory type of the memory devices to interface with and instruct the memory devices. For example, the host system may interface with memory devices via a parallel interface utilizing Double Data Rate (DDR) to obtain a certain bandwidth and capacity.

In some implementations, memory semantic protocols, such as compute express link (CXL) or Gen-Z, enable high-speed accessibility by processing elements. For example, CXL is an interface standard that can support a number of protocols that can run on top of PCIe, and thus, the CXL protocols can be multiplexed and transported via a PCIe physical layer. These technologies make possible low latency sharing of memory (including storage) resources among processing elements like central processing units (CPUs), graphics processing unit (GPUs), AI Accelerators, or Field-programmable gate arrays (FPGAs). However, there exists no sufficient management for memory (including storage) resources shared among multi-processing systems. In addition, the multi-memory and the multi-systems lack information at a high level to make the computing resources run more efficiently.

Aspects of the present disclosure address the above-noted and other deficiencies by providing information about memory usage over time from different perspectives, e.g. bandwidth, address sparsity, bank utilization (maybe referred to as "memory usage information") to multi-processing systems that share memory resources, so that the multi-processing systems can coordinate accesses to the shared memory resources. For example, a memory sub-system controller may obtain memory usage information and send it to all involved requestor systems (e.g., host systems that have sent a request for the shared memory resource), thus allowing the requestors' schedulers to schedule processes to fit the memory usage information. A requestor, requestor system, or requestor computer system may refer to a server, a host system, a virtual machine running on a host system, or a process running on a host system.

One example of memory usage information can include log data related to a memory usage statistic generated in a memory sub-system, where the memory usage statistic can be affected by multiple processes performed by hardware, software, and/or firmware in requestor systems. Examples of memory usage statistics include the memory bandwidth, raw bit error rate (RBER), and memory bank conflicts. Log data relating to the memory usage statistics can include, for example, timestamps (e.g., a timestamp of a data item, a timestamp of an event, a time elapsed by executing a task). Examples of log data related to a memory usage statistic may include, for example, bandwidth utilization on a communication bus of a memory device, a RBER log of a memory device, a bank conflicts log of a memory device.

In addition, the system according to the present disclosure can filter the memory usage information to have the reduced amount of log data. The system can also provide predicted data (e.g., a prediction of memory usage statistics) for a future period (e.g., the subsequent period immediately following the current period) based on the memory usage information. In some embodiments, the scheduling component may receive, from the memory devices, a signal (e.g., reflecting a triggering event) that causes the scheduler to retrieve the memory usage data and/or prediction data. In some embodiments, the scheduling component may perform periodical polling and reading of the memory usage data and/or prediction data.

The scheduling component can schedule the waiting and/or running processes based on the memory usage data and/or prediction data. In some implementations, the scheduling component may coordinate the process scheduling with other requestors accessing the shared memory resources. Examples of scheduling actions include, e.g., scheduling high-bandwidth processes to low-bandwidth usage periods and scheduling low-bandwidth processes to high-bandwidth usage periods, and/or dynamically adjusting processor clock frequency and voltage (DVFS) to generate a memory bandwidth to fit within available bandwidth during the upcoming time window.

Advantages of the present disclosure include improving overall system throughput by maximizing memory usage and minimizing the stall cycles and the wasted energy of requestor processors. For example, with the memory usage information and/or prediction information, requestor systems can take actions of coordinating such that high-demand or interfering applications are scheduled in a way that their demand peaks do not align. The coordinating actions would reduce interference and increase overall performance. Aspects of the present disclosure enable a global coordinated workload schedule that minimizes average processing slowdown due to memory subsystem bottlenecks.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The host system 120 can further utilize a compute express link (CXL) or Gen-Z interface for high-speed communication. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

In some embodiments, the memory sub-system 110 includes a memory usage monitoring component 113, which can be used to collect memory usage information. For example, the memory usage monitoring component 113 can retrieve the log data related to a memory usage statistic (e.g. a bandwidth utilization on a communication bus of the memory sub-system, a row buffer hit rate, or the rate of bank conflicts) upon a triggering event or at a predetermined frequency. In some implementations, the memory usage monitoring component 113 may filter the log data related to a memory usage statistic such that a reduced amount of data would be retrieved. In some implementations, the memory usage monitoring component 113 may make a prediction and generate prediction data related to the memory usage statistic. The memory usage monitoring component 113 can send the memory usage data and/or prediction data to the host system 120.

In some embodiments, the host system 120 includes a scheduling component 123, which can be used for enhanced task scheduling. The scheduling component 123 can receive, from the memory sub-system 110, memory usage data for managing (e.g., scheduling) the tasks/operations that are about to use the memory devices 130, 140. For example, the scheduling component 123 may obtain memory usage information of the memory devices 130, 140, determine, based on the memory usage information, a schedule of the plurality of tasks/operations of the host system 120, and implement the plurality of tasks/operations in accordance with the schedule. In some embodiments, the memory usage information may include memory bandwidth, RBER, bank conflicts, or any combination thereof. In another example, the scheduling component 123 may receive prediction data related to a memory usage statistic of the storage segment 137, determine, based on the prediction data, a schedule of the plurality of tasks/operations of the host system 120, and implement the plurality of tasks/operations in accordance with the schedule. The scheduling component 123 can be used to implement any suitable device(s) to perform any suitable application(s). For example, a memory buffer can be implemented to perform one or more persistent memory applications. In some embodiments, the memory sub-system controller 115 includes at least a portion of the scheduling component 123. In some embodiments, the scheduling component 123 is part of the host system 120, an application, or an operating system. In other embodiments, local media controller 135 includes at least a portion of the scheduling component 123 and is configured to perform the functionality described herein. Further details with regards to the operations of the scheduling component 123 are described below.

Figure 2:
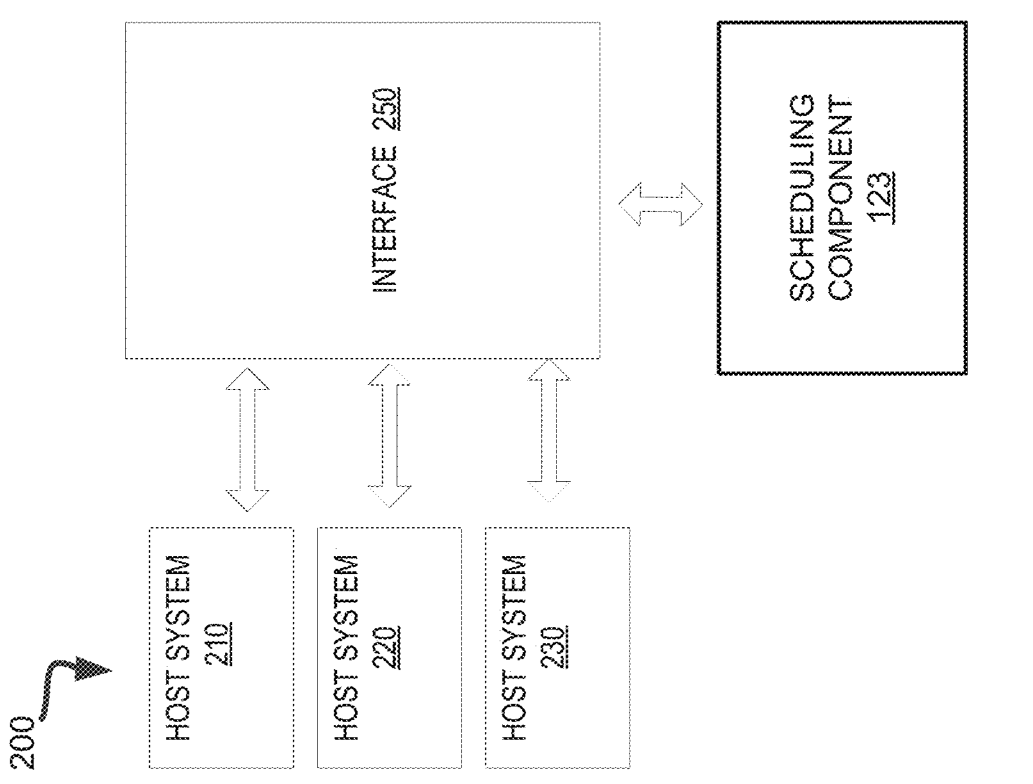
FIG. 2 is a block diagram of an example system for memory monitoring and scheduling in accordance with some embodiments of the present disclosure.

FIGS. 2 and 3 are explained together below. FIG. 2 illustrates an example system 200 that includes a scheduling component for memory monitoring and scheduling in accordance with some embodiments of the present disclosure. System 200 includes a scheduling component 123, host systems 210-230, and an interface 250. FIG. 3 illustrates an example system 300 of memory that includes a memory usage monitoring component for memory monitoring and scheduling in accordance with one or more aspects of the present disclosure. System 300 includes a memory usage monitoring component 113, memory sub-systems 310-330, and an interface 350.

In some implementations, the scheduling component 123, host systems 210-230 of FIG. 2 and the memory usage monitoring component 113, memory sub-systems 310-330 of FIG. 3 can be combined as one system including multiple host systems and multiple memory sub-systems. In some implementations, the scheduling component 123, host systems 210-230 of FIG. 2 and the memory usage monitoring component 113, memory sub-system 110 of FIG. 1 can be combined as one system including multiple host systems and one memory sub-system. In some implementations, the scheduling component 123, host system 120 of FIG. 1 and the memory usage monitoring component 113, memory sub-systems 310-330 of FIG. 3 can be combined as one system including one host system and multiple memory sub-systems. In all of the above implementations, the host system(s) may include a plurality of host processes that require access to shared resources from the memory sub-system(s).

In some implementations, system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. In some implementations, system 200 can be portion of a large system including multiple host systems that use interface 250 to share the resources from multiple memory sub-systems.

In some implementations, system 300 can be a memory or storage device. In some implementations, system 300 can be portion of a large system including multiple host systems that use interface 350 to share the resources from multiple memory sub-systems.

The components, modules, or features discussed in regards to system 200 or 300 may be consolidated or spread in any manner across the system. For example, two or more of the components or portions of the components may be combined into a single component, or one of the components may be divided into two or more modules. In one implementation, one or more of the modules may be executed by different processing devices on different computing devices (e.g., different server computers).

Interface 250 or 350 may provide communication connections between the host system(s) (e.g., host system 120 of FIG. 1, or host systems 210-230 of FIG. 2) and the memory sub-systems (e.g., memory sub-system 110 of FIG. 1, or memory sub-systems 310-330 of FIG. 3) for passing control, address, data, and other signals. Interface 250 or 350 may be the same as or similar to the physical host interface described with respect to FIG. 1. Interface 250 or 350 may be referred to as channels including one or more single paths between terminals associated with the host systems and the memory sub-systems, for example, command and address channels, clock signal channels, data channels, other channels, or any combination thereof. Interface 250 or 350 may further include a network, such as a public network (e.g., the Internet), a private network (e.g., a local area network (LAN) or wide area network (WAN)), or a combination thereof.

Referring to FIG. 2, each of host systems 210-230 may include a processor (e.g., circuitry, processing circuitry, a processing component) or any processing logic that uses memory to execute processes, including user space processes (e.g., application processes), kernel processes (e.g., system processes), hypervisor processes, virtual machine processes, container processes, other processes, or a combination thereof. In some implementations, each of the host systems 210-230 may be a host operating system, a guest operating system, an application, a virtual machine, a user space, or any combination thereof. The host systems 210-230 may run separate and unrelated processes, related processes, cooperated processes, or any combination thereof. The host systems may include a plurality of host processes that require access to shared resources from memory sub-systems. The host processes may be any computing processes that include program instructions that are executed by host systems. Each of the host processes may include one or more threads or instruction streams that can request access to memory resources of memory sub-systems. The host systems 210-230 may include processing logic to control operations of the host processes, including the start time, end time, pause time, resume time for the operations.

The scheduling component 123 may be hosted by each of the host systems and may include one or more computer programs executed by each of the host systems for scheduling management of system 200. In the example shown in FIG. 2, the host systems 210-230 are configured to share the memory sub-systems, and scheduling component 123 may coordinate the usage of shared memory resources with other host systems. As shown in FIG. 2, scheduling component 123 may obtain log data reflecting a memory usage statistic of a shared storage segment of the memory sub-systems, determine a schedule of the host systems 210-230 based on the log data, and implement the host systems 210-230 in accordance with the schedule. In another example, the scheduling component 123 may obtain prediction data related to a memory usage statistic of a shared storage segment of the memory sub-systems, and determine a schedule of the host systems 210-230 based on the prediction data.

Specifically, the scheduling component 123 may obtain monitoring data related to one or more memory usage statistics of one or more memory sub-systems 310-330. The memory usage statistics may include the bandwidth usage on a communication bus of the memory sub-system, a row buffer hit rate, and the rate of bank conflicts, or any combination thereof. The bandwidth usage may be specific to a memory element (e.g., a die of a memory device) and a process. The bandwidth information can be used when the first task and the second task are competing for the bandwidth usage for scheduling management of the first task and the second task.

The row buffer hit ratio (RBHR) may refer to the ratio of buffer cache hits to total requests including cache hits and cache misses, i.e., the probability that a data row will be in memory in a subsequent block re-read. A cache hit occurs when a file is requested from a cache and the cache is able to fulfill that request. A cache miss is when the cache does not contain the requested content. Higher RBHR can significantly improve overall database performance. For example, when the first task and the second task are competing for the memory, the number of the cache miss is high compared to the case of no competition, and the RBHR information can be used as an indicator that the memory has high usage intensity, and thus, scheduling management of the first task and the second task can be arranged. In some implementations, if the value of RBHR is below a threshold value (i.e., the number of the cache misses is high), the tasks involved during the low RBHR period would be coordinated for scheduling management, resulting in the reduced number of cache misses.

Shared memory that can be accessed in parallel can be divided into modules (also called "banks"). Bank conflicts occur when two memory locations (addresses) that are requested are in the same bank, and the access thus has to be performed serially, losing the advantages of parallel access. For example, when the first task and the second task are competing for the memory, the rate of bank conflicts is high compared to the case of no competition, and the bank conflicts rate information can be used as an indicator that the memory has high usage intensity, and thus, scheduling management of the first task and the second task can be arranged. In some implementations, if the rate of bank conflicts exceeds a threshold value, the tasks involved during the high bank conflicts rate period can be coordinated for scheduling management, resulting in the reduced rate of bank conflicts.

In some implementations, scheduling component 123 may select memory usage statistics related to the specific memory. For example, scheduling component 123 may select the same memory usage statistic for all memory elements in system 200. In another example, scheduling component 123 may select one memory usage statistic for a first memory element, and select a different memory usage statistic for a second memory element. In yet another example, scheduling component 123 may select one memory usage statistic for a first memory element, and select at least two memory usage statistics for a second memory element. In some implementations, a selection of memory usage statistics may be skipped, for example, when one or more memory usage statistics are set as default for monitoring.

In some implementations, scheduling component 123 may detect an event that triggers monitoring the shared resources of memory sub-systems and trigger the monitoring in response to the detection. The triggering events may include a memory sub-system controller sending and/or receiving data or accessing a memory location of the shared memory 340, a notification related to some reliability statistic (e.g., raw bit error rate (RBER), wear leveling, etc.) of a memory device, an error experienced by the memory sub-system controller in reading data from or writing data to the shared memory device, garbage collection, encoding and/or decoding, retrieving memory access commands from a queue(s) (e.g., a scheduling queue, a submission queue, etc.), data reconstruction, direct memory access (DMA) operations, media scans, or any other event relating to memory access operations. In some implementations, scheduling component 123 may receive, from at least two of host systems 210-230, access requests to a same part of the shared resources of memory sub-systems. Scheduling component 123 may trigger monitoring the memory sub-systems in response to receiving such requests. In response to a trigging event, the scheduling component may enable or disable monitoring.

Scheduling component 123 may enable or disable monitoring by sending, to the memory sub-system, a request for switching on or off monitoring, for example, a request for monitoring. The request for monitoring may include an indication of one or more memory usage statistics related to memory. The request for monitoring may include an identification of one or more memory elements to be monitored. The request for monitoring may include a command to initiate monitoring operations at one or more memory elements. In some implementations, sending a request for monitoring is triggered when a workload or environment change in the memory sub-systems is detected. In some implementations, sending a request for monitoring is triggered when an event related to a specific memory element is detected. In some implementations, sending a request for monitoring is performed at certain intervals, and the intervals may be preset by a host system or a user through an interface. In some implementations, sending a request for monitoring is triggered directly in response to a user's input for requesting monitoring (e.g., a system administrator, or a user of the processes).

Referring to FIG. 3, the memory usage monitoring component 113 may be hosted by each of memory sub-systems and may include one or more computer programs executed by each of memory sub-systems for monitoring management of system 300. The memory usage monitoring component 113 may include processing logic to record data related to memory sub-systems 310-330. In the example as shown in FIG. 3, the host systems are configured to share the memory sub-systems 310-330, and may make a coordination between the host processes for shared memory resources from the memory sub-systems 310-330.

Responsive to receiving the request for monitoring from the host systems (e.g., from the scheduling component 123 of FIG. 1 or 2), memory usage monitoring component 113 may initiate monitoring commands for the memory element (e.g., a set of pages) indicated in the request, and the monitoring commands may be received by the memory element(s). In some cases, the monitoring commands may include an indication of one or more memory usage statistics selected previously. In some cases, the monitoring command may include a request to retrieve data. For example, memory usage monitoring component 113 may monitor the memory element by retrieving data related to a memory usage statistic (e.g. a memory bandwidth, a row buffer hit rate, or the rate of bank conflicts) of the memory element indicated in the request. In some examples, memory usage monitoring component 113 may monitor addresses of the memory devices that are specified in the monitoring command. For example, the host systems (e.g., from the scheduling component 123 of FIG. 1 or 2) may divide a range of continuous addresses (e.g., a set of pages having continuous logical addresses) into one or more regions, and addresses within a region may be assumed to have a similar access pattern, such that the host systems may generalize information for a selected address of a region to the entire region, and under such situations, it may be sufficient to monitor the parameter of a random address within a region. Thus, the host systems may determine data related to a memory usage statistic for each address of region by determining data related to a memory usage statistic for a selected address from each region, for example by transmitting the monitoring command including an indication for data related to a memory usage statistic for the selected addresses.

In some implementations, each of memory sub-systems 310-330 can store a logging data structure that records memory state information, such as, for example, memory resource data (e.g., active write location, block recovery data, etc.), statistic data (e.g., read counters, write counters, wear leveling counters, garbage collection operation counters, etc.), instruction cycle data (e.g., timestamp data, duration data, etc.), and memory usage monitoring component 113 can then retrieve memory usage data, for example, the log data related to a memory usage statistic (e.g. a memory bandwidth, a row buffer hit rate, or the rate of bank conflicts) from the logging data structure. For example, each logging data structure can be stored at a specific address of each of the memory sub-systems 310-330, and each of memory sub-systems 310-330 can send to memory usage monitoring component 113 the physical address or logical address of their respective logging data structures upon creating (e.g., during boot up to the memory element) or upon requested by memory usage monitoring component 113 (e.g., a monitoring command for the memory element). Memory usage monitoring component 113 may access the specific address for retrieving memory usage data upon receiving the request for monitoring.

In some implementations, memory usage monitoring component 113 can receive the log data related to a memory usage statistic (e.g. a memory bandwidth, a row buffer hit rate, or the rate of bank conflicts per request) when detecting a triggering event. The triggering event may include a memory sub-system controller sending and/or receiving data or accessing a memory location of the shared memory, a notification related to some reliability statistic (e.g., raw bit error rate (RBER), wear leveling, etc.) of a memory device, an error experienced by the memory sub-system controller in reading data from or writing data to the shared memory device, garbage collection, encoding and/or decoding, retrieving memory access commands from a queue(s) (e.g., a scheduling queue, a submission queue, etc.), data reconstruction, direct memory access (DMA) operations, media scans, or any other event relating to memory access operations.

In some implementations, memory usage monitoring component 113 can retrieve the log data related to a memory usage statistic (e.g. a memory bandwidth, a row buffer hit rate, or the rate of bank conflicts) at a predetermined frequency (e.g., responsive to a periodic expiration of a timer). In some implementations, memory usage monitoring component 113 may further filter the data for the behavior of interest, such as when a state change is detected. For example, memory usage monitoring component 113 may filter the data by retrieving data having the reduced number of logging entries, e.g. by applying hysteresis where a change in value of the data is required to be larger than a percentage before a logging entry is recorded.

In some embodiments, memory usage monitoring component 113 may access the log data related to a memory usage statistic (e.g. a memory bandwidth, a row buffer hit rate, or the rate of bank conflicts) in each of memory sub-systems 310-330 and make a prediction about the memory state. For example, memory usage monitoring component 113 may scan backwards through the logging data structure (e.g., log of bandwidth, log of row buffer hit rate, or log of the rate of bank conflicts) to find a pattern matching the most recent measurements, and use the pattern as the prediction data. In another example, memory usage monitoring component 113 may use the logged measurements immediately following the matched pattern as the prediction data. For example, the memory usage monitoring component 113 may quantize the last N samples of bandwidth (e.g. low, med, high bandwidths), scan backwards through the history to compare with the last N samples (each with values corresponding to low, med, high bandwidths). When there is a first match between the last N samples and a portion in the history, the memory usage monitoring component 113 may determine that the future prediction is a sequence that is the same as the sequence that come immediately after the matched portion in the history. In another example, a different sequence predictor, such as a Deep Neural Network (e.g. Convolutional or Recurrent Neural Network) may be used to determine the future prediction similarly.

In some implementations, memory usage monitoring component 113 may receive memory usage patterns that are found through historical data and predict, for future periods, memory usage patterns based on the historical memory usage patterns. Memory usage monitoring component 113 may store the prediction data and send the prediction data to analysis component for analysis in the scheduling determination.

Memory usage monitoring component 113 can send the memory usage data and/or prediction data to the scheduling component 123, for example via a command in the memory protocol, writing a flag to a shared memory location, or causing an interrupt in the host systems 210-230.

Referring back to FIG. 2, upon receiving the memory usage data and/or prediction data, scheduling component 123 may enable the host systems to determine a schedule for processes according to the memory usage data and/or prediction data. For example, scheduling may involve selecting, upon multiple waiting processes associated with a given hardware processor, a process to run within the next scheduling time slice. In some examples, such schedule may be used to schedule a process with low bandwidth demand during a period of high bandwidth usage and schedule a process with high bandwidth demand during a period of low bandwidth usage, as illustrated by an example with respect to FIG. 7. In some examples, such schedule may be used to adjust a clock frequency and voltage associated with a process so that the bandwidth usage of the process will be increased or decreased in order to be scheduled during a period of high or low bandwidth usage, as illustrated by an example with respect to FIG. 8. In some implementations, the scheduling decisions made based on memory usage information may override the process priorities (e.g., scheduling a lower priority process that is determined to fit the memory usage pattern even if a higher priority process (which is determined to not fit the memory usage pattern) is waiting). In some implementations, the scheduling decisions made based on memory usage information may override previous scheduling setups for involved processes.

Figure 4:
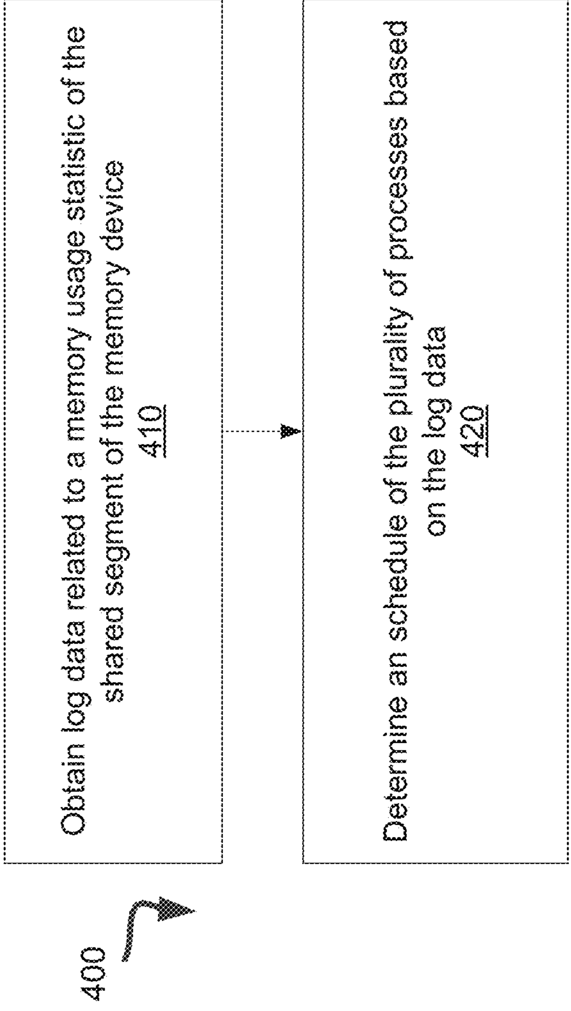
FIG. 4 is a flow diagram of an example method for performing memory monitoring and scheduling by a host system in accordance with some embodiments of the present disclosure.

FIG. 4 is a flow diagram of an example method 400 to implementing the memory phase monitoring and scheduling, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the scheduling component 123 of FIG. 1 or the scheduling component 123 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic may obtain log data related to a memory usage statistic of the shared segment of the memory device. In some implementations, the processing logic may receive the log data related to a memory usage statistic of the shared segment of the memory device, for example, from the memory sub-system controller. In some implementations, the processing logic may obtain the data at a predefined monitoring frequency. The memory usage statistic may reflect, e.g., the bandwidth utilization on a communication bus of the memory sub-system, the row buffer hit rate, and/or the rate of bank conflicts.

At operation 420, the processing logic may process the information received at operation 410. The processing logic may determine a schedule of the plurality of processes, which are configured to share the segment of the memory device, according to the log data, as described in more detail above. The processing logic may implement the determination made at operation 420. The processing logic may implement the plurality of processes according to the schedule determined earlier. For example, the processing logic may control each process according to the respective scheduling times, for example, including start time, stop time, pause time, or resume time. In another example, the processing logic may send an instruction to a respective controller that controls the respective process of processes for implementing the schedule. For example, the instruction may include a start time, a stop time, a pause time, a resume time, or other time for a process.

Figure 5:
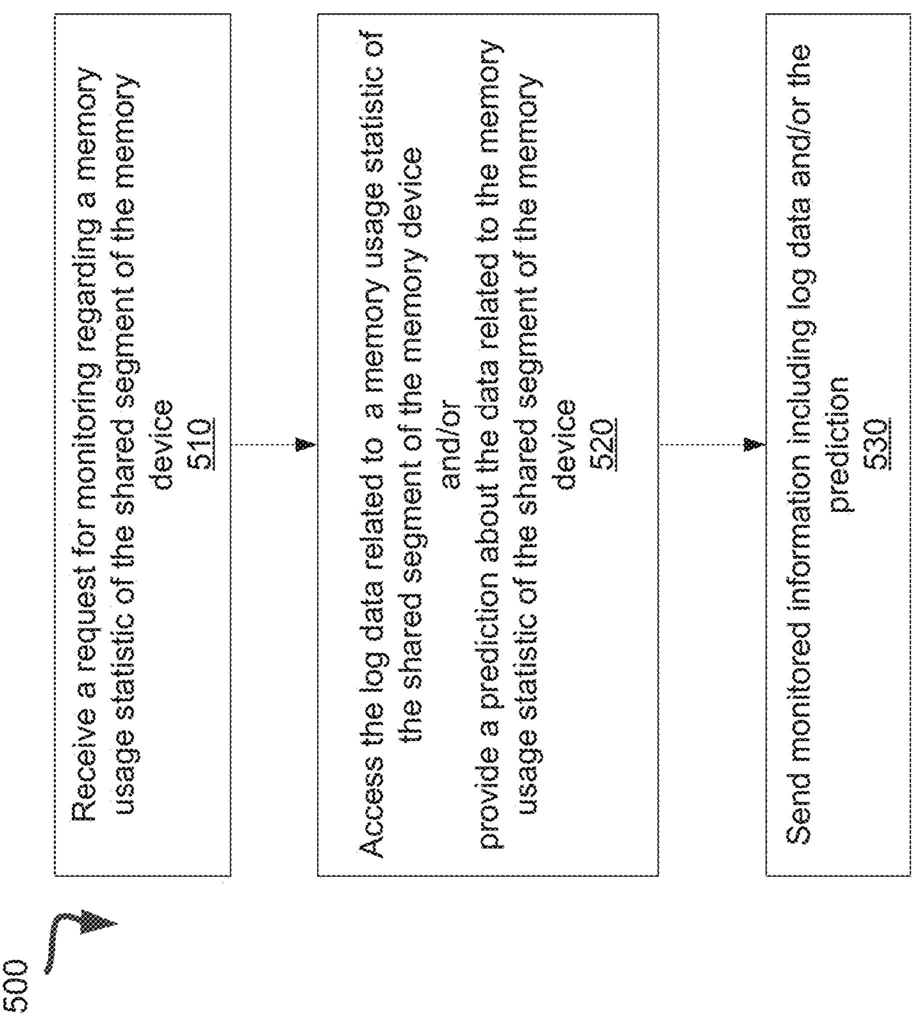
FIGS. 5-6 are flow diagrams of example methods for performing memory monitoring and scheduling by a memory sub-system in accordance with some embodiments of the present disclosure.

FIG. 5 is a flow diagram of an example method 500 to implementing the memory phase monitoring and scheduling, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory usage monitoring component 113 of FIG. 1 or the memory usage monitoring component 113 of FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic may receive a request for monitoring regarding a specified memory usage statistic of the shared segment of the memory device. In some examples, the processing logic may receive a request for log data related to a memory usage statistic of the shared segment of the memory device.

At operation 520, the processing logic may respond to the request received at operation 510. In some implementations, the processing logic may monitor memory usage by a plurality of hosts connected to the memory sub-system, and log a plurality of values of a memory usage statistic reflecting the memory usage by each host of a plurality of hosts. Thus, the log data related to a memory usage statistic may include a plurality of values of a memory usage statistic reflecting the memory usage by each host of a plurality of hosts.

In some implementations, the processing logic may access the log data related to a memory usage statistic of the shared segment of the memory device, for example, in the memory device or in other storage or processor that store the data. In some implementations, the processing logic may obtain the data with a monitoring interval.

In some implementations, the processing logic may access log data related to a memory usage statistic (e.g. a memory bandwidth, a row buffer hit rate, or the rate of bank conflicts) in the shared segment of the memory device and make a prediction about the memory state. For example, the processing logic may scan backwards through the logging data structure (e.g., log of bandwidth, log of row buffer hit rate, or log of the rate of bank conflicts) until a pattern matching the most recent measurements is found, and use the logged measurements immediately following the matched pattern as the prediction data.

At operation 530, the processing logic may send the log data and/or the prediction data to the host system(s), which may utilize the data for process scheduling. In some implementations, the processing logic may transmit, to one or more hosts, memory usage data derived from the plurality of values of a memory usage statistic. Transmitting the memory usage data to the host may be performed responsive to detecting a triggering event, or receiving a request from the host. The memory usage data may be used to identify a process of one or more hosts for scheduling to run during a period. The memory usage data may be used to schedule one or more processes of the host systems to run during a period.

Figure 6:
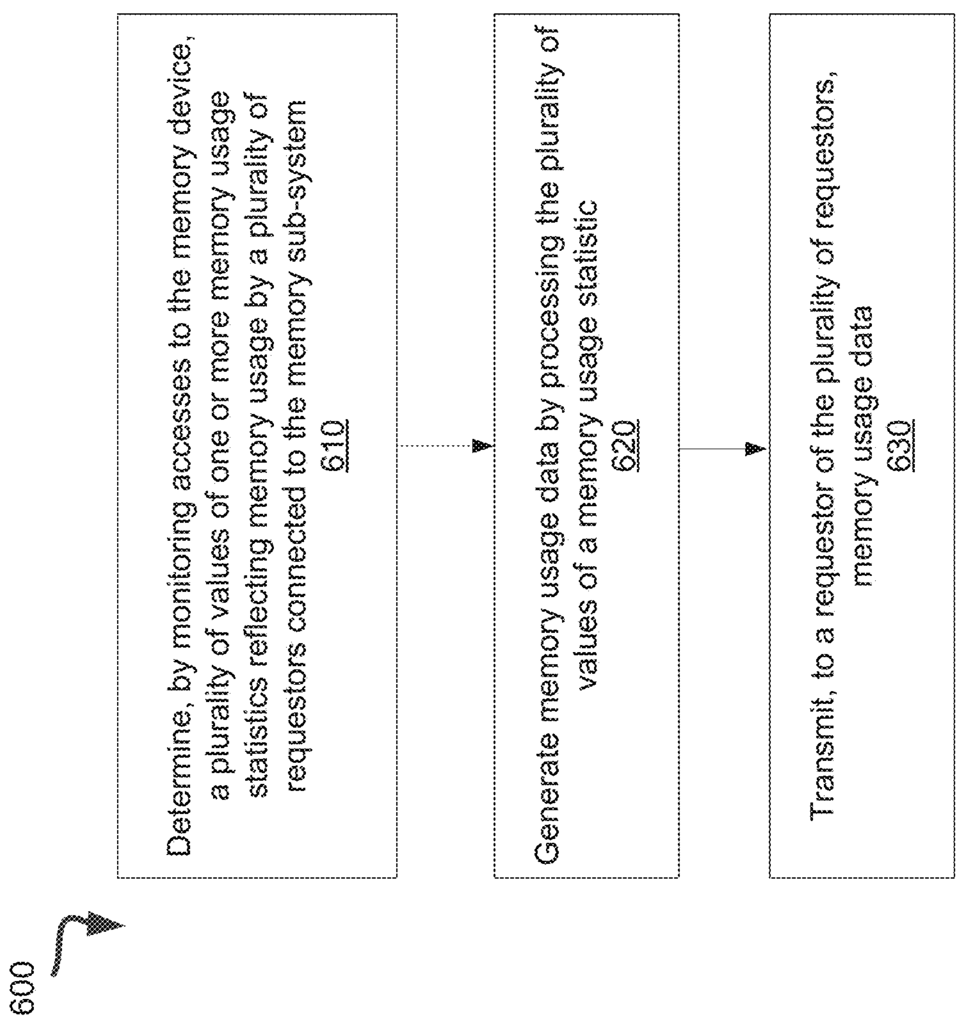

FIG. 6 is a flow diagram of an example method 600 to implementing the memory phase monitoring and scheduling, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the memory sub-system 110 of FIG. 1 or the memory sub-systems 310-330 of FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic may determine, by monitoring accesses to the memory device, data (e.g., values) of one or more memory usage statistics reflecting memory usage by one or more requestors connected to the memory sub-system. In some implementations, the processing logic may monitor memory usage by one or more requestors connected to the memory sub-system. In some implementations, the processing logic may log the values of a memory usage statistic reflecting the memory usage by each of the requestors. The memory usage statistic may reflect, e.g., a bandwidth utilization on a communication bus of the memory sub-system, a row buffer hit rate, and/or the rate of bank conflicts. The values of the memory usage statistic may be grouped by an address range within an address space associated with the memory device. The grouping may correspond to a process of a requestor or a requestor among a set of the requestors.

At operation 620, the processing logic may generate memory usage data by processing the values of a memory usage statistic reflecting the memory usage by each of the requestors. In some implementations, the processing logic may filter the values of the memory usage statistic. For example, the processing logic may filter the values of the memory usage statistic by accessing only the values logged at a predetermined frequency. In another example, the processing logic may filter the values of the memory usage statistic by accessing only the values logged when a change in value satisfying a threshold. In some implementations, the processing logic may detect a significant change (e.g., a change exceeding a threshold value) in the values of the memory usage statistic, and notify the requestor of the significant change. In some implementations, the processing logic may predict a future value of the memory usage statistic. For example, the processing logic may predict a future value by finding a pattern through the previous values.

At operation 630, the processing logic may transmit, to one of the requestors, memory usage data derived from the values of a memory usage statistic. Transmitting the memory usage data to the requestor may be performed responsive to detecting a triggering event, or sending a request from the requestor to the memory sub-system. The memory usage data may be used to identify a process of the requestor for scheduling to run during a period. The memory usage data may be used to schedule one or more processes of the requestors to run during a period.

Figure 7:
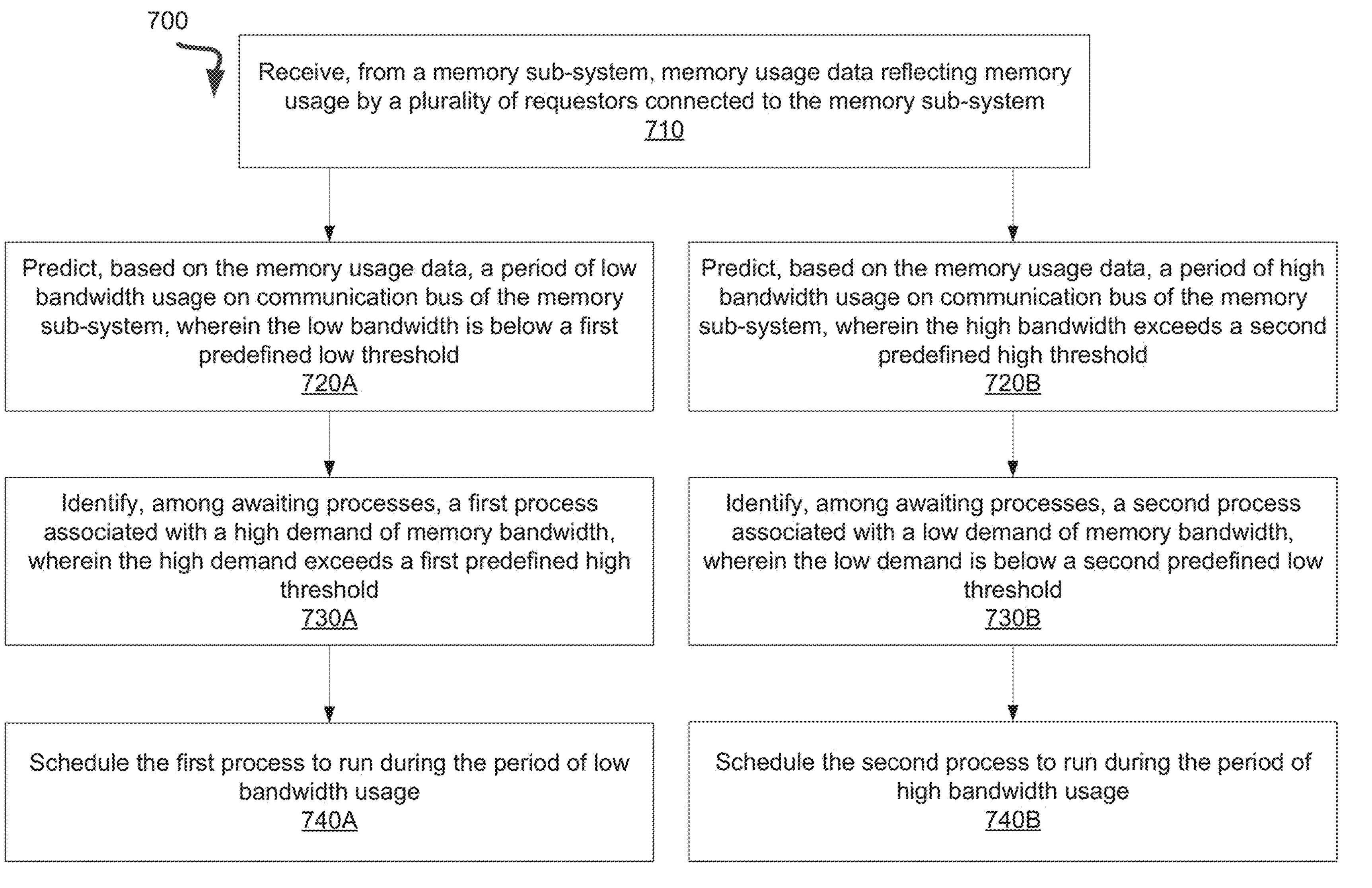
FIGS. 7-8 are flow diagrams of example methods for performing memory monitoring and scheduling by a host system in accordance with some embodiments of the present disclosure.

FIG. 7 is a flow diagram of an example method 700 to implementing the memory phase monitoring and scheduling, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the host system 120 of FIG. 1 or the host systems 210-230 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic may receive, from a memory sub-system, memory usage data reflecting memory usage by one or more requestors connected to the memory sub-system. The process may proceed to operation 720A, operation 720B, or operations 720A and 720B.

At operation 720A, the processing logic may predict, based on the memory usage data, a period of low bandwidth usage on a communication bus of the memory sub-system, wherein the low bandwidth is below a first predefined low threshold. At operation 730A, the processing logic may identify, among awaiting processes, a first process associated with a high demand of memory bandwidth, wherein the high demand exceeds a first predefined high threshold. At operation 740A, the processing logic may schedule the first process to run during the period of low bandwidth usage.

At operation 720B, the processing logic may predict, based on the memory usage data, a period of high bandwidth usage on the communication bus of the memory sub-system, wherein the high bandwidth exceeds a second predefined high threshold. At operation 730B, the processing logic may identify, among awaiting processes, a second process associated with a low demand of memory bandwidth, wherein the low demand is below a second predefined low threshold. At operation 740B, the processing logic may schedule the second process to run during the period of high bandwidth usage.

It is noted that the first predefined low threshold, the second predefined low threshold, the first predefined high threshold, the second predefined high threshold can be the same as or different from each other.

Figure 8:
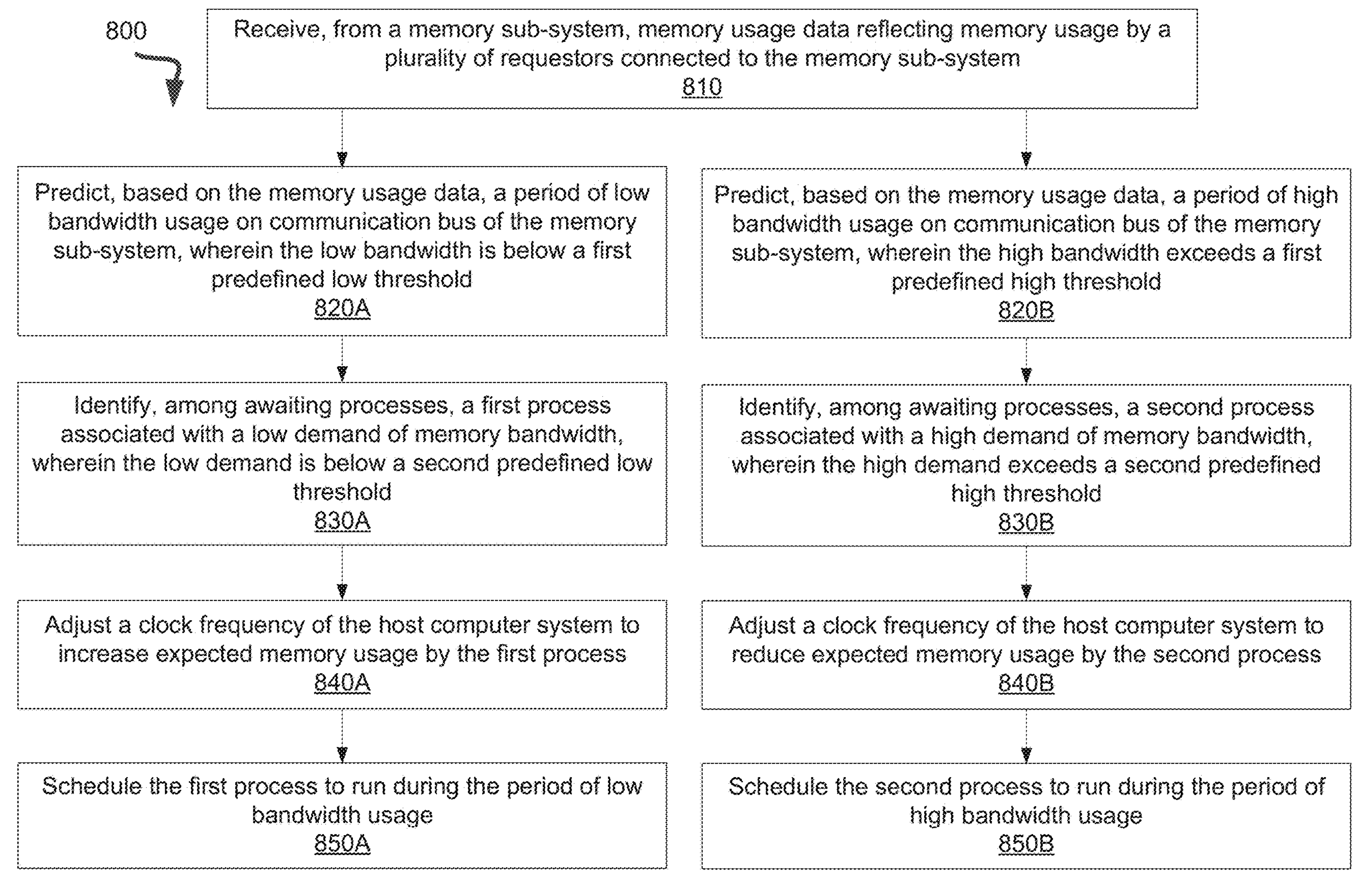

FIG. 8 is a flow diagram of an example method 800 to implementing the memory phase monitoring and scheduling, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the host system 120 of FIG. 1 or the host systems 210-230 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic may receive, from a memory sub-system, memory usage data reflecting memory usage by one or more requestors connected to the memory sub-system. The process may proceed to operation 820A, operation 820B, or operations 820A and 820B.

At operation 820A, the processing logic may predict, based on the memory usage data, a period of low bandwidth usage on the communication bus of the memory sub-system, wherein the low bandwidth is below a first predefined low threshold. At operation 830A, the processing logic may identify, among awaiting processes, a first process associated with a low demand of memory bandwidth, wherein the low demand is below a second predefined low threshold. At operation 840A, the processing logic may adjust a clock frequency of the requestor computer system to increase expected memory usage by the first process. At operation 850A, the processing logic may schedule the first process to run during the period of low bandwidth usage.

At operation 820B, the processing logic may predict, based on the memory usage data, a period of high bandwidth usage on the communication bus of the memory sub-system, wherein the high bandwidth exceeds a first predefined high threshold. At operation 830B, the processing logic may identify, among awaiting processes, a second process associated with a high demand of memory bandwidth, wherein the high demand exceeds a second predefined high threshold. At operation 840B, the processing logic may adjust a clock frequency of the requestor computer system to reduce expected memory usage by the second process. At operation 850B, the processing logic may schedule the second process to run during the period of high bandwidth usage.

It is noted that the first predefined low threshold, the second predefined low threshold, the first predefined high threshold, the second predefined high threshold can be the same as or different from each other.

Although it is not illustrated here, another scheduling policy can involve scheduling compute-bound (e.g., usage of CPU) processes and memory-bound (e.g., usage of memory) processes together. The compute-bound process will keep a (multithreaded) CPU working while the memory-bound process is stalled waiting on memory.

Figure 9:
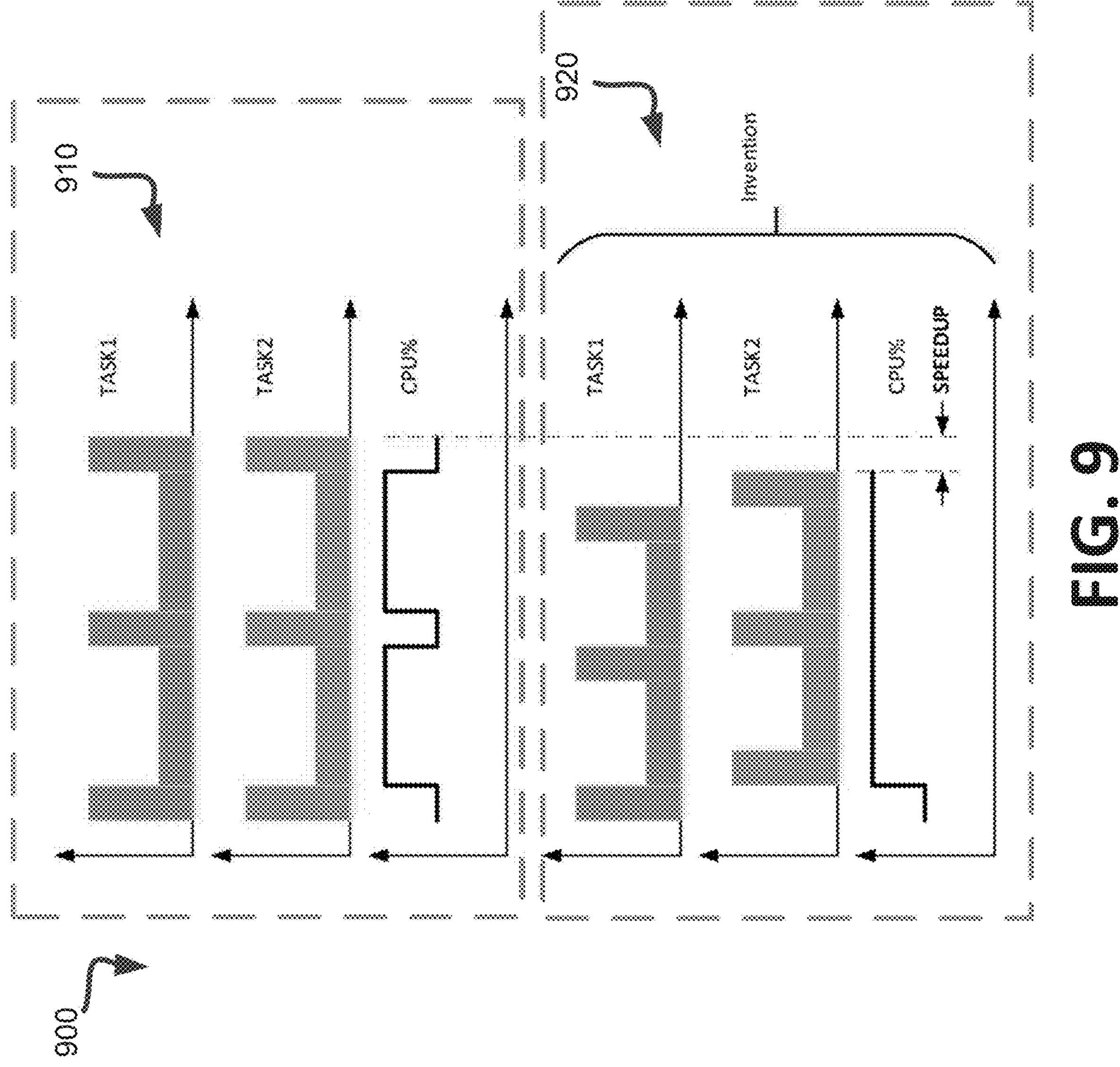
FIG. 9 is an example illustrating a result of performing memory monitoring and scheduling in accordance with some embodiments of the present disclosure.

FIG. 9 is an example illustrating a result of performing memory monitoring and scheduling in accordance with some embodiments of the present disclosure. As shown in part 910 of FIG. 9, the memory bandwidth is monitored for task 1 and task 2. Task 1 and task 2 may access a shared memory resource, competing for bandwidth (y-axis), and the resulting CPU usage may have busy periods due to the competition of usage of the memory resources and idle periods when there is no task performed. In some cases, the CPU becomes idle because the total available bandwidth has been saturated when high bandwidth periods coincide, forcing the CPU to slow down without issuing new instructions. As shown in part 920 of FIG. 6, memory telemetry information and/or prediction information read from the memory device by the requestor system(s) informs of the bandwidth utilization, including current information, history information, and future prediction information. The requestor systems or applications may coordinate for adjusting the schedule as illustrated with examples in FIGS. 1, 2, 4, 7, and 8. In FIG. 6, the system or application controlling task 2 schedules its high-bandwidth phase to begin after the task 1's high-bandwidth phase, eliminating memory bottleneck, increasing CPU utilization, and speeding up all workloads. As such, the disclosed method and system make the CPU usage more efficient for task 1 and task 2, resulting in neither bottleneck nor idle performance.

Figure 10:
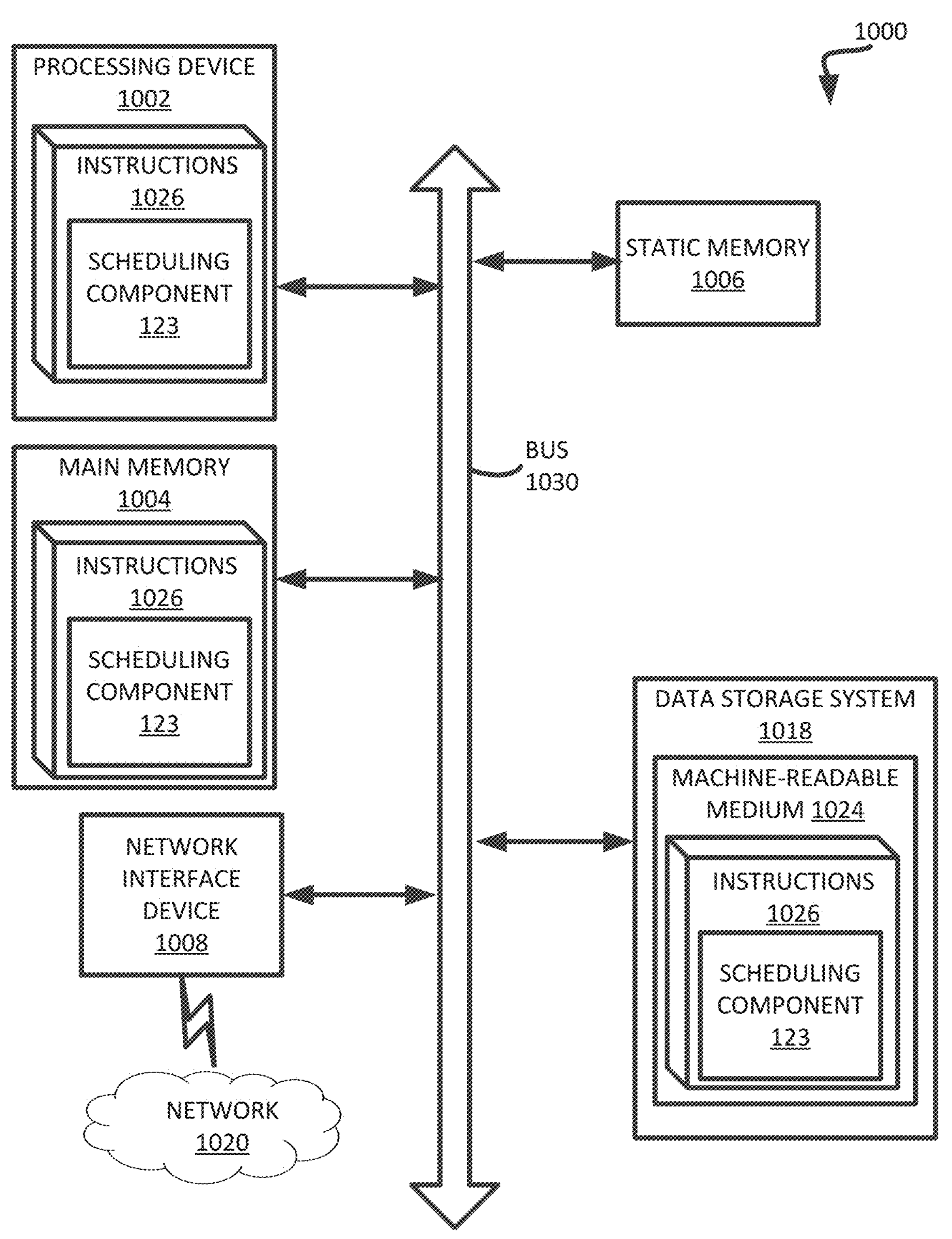
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the schedule component 123 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or RDRAM, etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to a scheduling component (e.g., the scheduling component 123 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

What is claimed is:

1. A host system, comprising:

a memory; and a processing device, coupled to the memory, to perform operations comprising:

obtaining log data from a memory sub-system of a plurality of memory sub-systems, wherein the log data reflects memory usage of a memory device of the memory sub-system, wherein the memory device is shared by a plurality of host systems, including the host system, connected to the plurality of memory sub-systems; and determining, based on the log data, a schedule of a plurality of processes running on the plurality of host systems, wherein the plurality of processes share the memory device.

2. The host system of claim 1, wherein the log data reflects a bandwidth utilization on a communication bus of the memory sub-system.

3. The host system of claim 1, wherein the log data reflects a row buffer hit rate.

4. The host system of claim 1, wherein the log data reflects a rate of memory bank conflicts.

5. The host system of claim 1, wherein the operations further comprise:

obtaining prediction data related to memory usage statistics reflected by the log data; and determining the schedule according to the prediction data.

6. The host system of claim 1, wherein the operations further comprise:

detecting a triggering event; and triggering monitoring the memory device of the memory sub-system.

7. The host system of claim 1, wherein obtaining the log data is performed at a predefined frequency.

8. A method, comprising:

obtaining, by a host system, log data from a memory sub-system of a plurality of memory sub-systems, wherein the log data reflects memory usage of a memory device of the memory sub-system, wherein the memory device is shared by a plurality of host systems, including the host system, connected to the plurality of memory sub-systems; and determining, based on the log data, a schedule of a plurality of processes running on the plurality of host systems, wherein the plurality of processes share the memory device.

9. The method of claim 8, wherein the log data reflects a bandwidth utilization on a communication bus of the memory sub-system.

10. The method of claim 8, wherein the log data statistic reflects a row buffer hit rate.

11. The method of claim 8, wherein the log data reflects a rate of memory bank conflicts.

12. The method of claim 8, further comprising:

obtaining prediction data related to memory usage statistics reflected by the log data; and determining the schedule according to the prediction data.

13. The method of claim 8, further comprising:

detecting a triggering event; and triggering monitoring the memory device of the memory sub-system.

14. The method of claim 8, wherein obtaining the log data is performed at a predefined frequency.

15. A non-transitory computer-readable storage medium comprising instructions that, when executed by a host system of a plurality of host system, cause the host system to perform operations comprising:

obtaining log data from a memory sub-system of a plurality of memory sub-systems, wherein the log data reflects memory usage of a memory device of the memory sub-system, wherein the memory device is shared by the plurality of host systems, including the host system, connected to the plurality of memory sub-systems; and determining, based on the log data, a schedule of a plurality of processes running on the plurality of host systems, wherein the plurality of processes share the memory device.

16. The non-transitory computer-readable storage medium of claim 15, wherein the log data reflects a bandwidth utilization on a communication bus of the memory sub-system.

17. The non-transitory computer-readable storage medium of claim 15, wherein the log data reflects a row buffer hit rate.

18. The non-transitory computer-readable storage medium of claim 15, wherein the log data reflects a rate of memory bank conflicts.

19. The non-transitory computer-readable storage medium of claim 15, wherein the operations further comprise:

obtaining prediction data related to memory usage statistics reflected by the log data; and determining the schedule according to the prediction data.

20. The non-transitory computer-readable storage medium of claim 15, wherein the operations further comprise:

detecting a triggering event; and triggering monitoring the memory device of the memory sub-system.

* * * * *